United States Patent
Thubert et al.

(10) Patent No.: US 11,349,807 B2
(45) Date of Patent: May 31, 2022

(54) DIRECTED MULTICAST BASED ON MULTI-DIMENSIONAL ADDRESSING RELATIVE TO IDENTIFIABLE LLN PROPERTIES

(71) Applicant: Cisco Technology, Inc., San Jose, CA (US)

(72) Inventors: Pascal Thubert, Roquefort les Pins (FR); Yinfang Wang, Shanghai (CN); Huimin She, Shanghai (CN); Feiliang Wang, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 97 days.

(21) Appl. No.: 16/838,252

(22) Filed: Apr. 2, 2020

(65) Prior Publication Data
US 2021/0314290 A1 Oct. 7, 2021

(51) Int. Cl.
*H04L 29/12* (2006.01)
*H04L 12/24* (2006.01)
(Continued)

(52) U.S. Cl.
CPC ........ *H04L 61/2069* (2013.01); *H04L 12/185* (2013.01); *H04L 41/12* (2013.01); *H04L 69/22* (2013.01); *H04L 61/6059* (2013.01)

(58) Field of Classification Search
CPC ............... H04L 61/2069; H04L 12/185; H04L 12/184; H04L 69/22; H04L 41/12
See application file for complete search history.

(56) References Cited

U.S. PATENT DOCUMENTS

| 6,917,618 | B2 | 7/2005 | Thubert et al. |
| 7,519,733 | B1 | 4/2009 | Thubert et al. |
| 9,232,498 | B2 * | 1/2016 | Mohanty ............... H04L 1/1812 |

(Continued)

FOREIGN PATENT DOCUMENTS

WO 2017141076 A1 8/2017

OTHER PUBLICATIONS

Thubert, Ed., et al., "Address Protected Neighbor Discovery for Low-power and Lossy Networks", Feb. 25, 2019, [online], 6lo Internet Draft, Feb. 25, 2019, [retrieved on Mar. 12, 2020]. Retrieved from the Internet: URL: <https://tools.ietf.org/pdf/draft-ietf-6lo-ap-nd-11.pdf>, pp. 1-26.

(Continued)

*Primary Examiner* — Nam T Tran
(74) *Attorney, Agent, or Firm* — Leon R. Turkevich

(57) ABSTRACT

In one embodiment, a method comprises: receiving, by a root network device providing a DAG topology in a low power and lossy network (LLN), one or more multicast registration messages from an LLN device and identifying distinct properties of the LLN device; receiving, by the root network device, one or more multicast address group identifiers of one or more multicast streams to which the LLN device has subscribed, and associating the one or more multicast address group identifiers with the distinct properties; receiving a multicast message specifying one of the multicast address group identifiers; and generating, by the root network device, a directed multicast message having a multi-dimensional addressing data structure comprising a selected one of the distinct properties and the one multicast address group identifier, causing parent network devices in the DAG topology to selectively retransmit based on determining a child network device has the selected one distinct property.

19 Claims, 7 Drawing Sheets

(51) Int. Cl.
  *H04L 29/06* (2006.01)
  *H04L 12/18* (2006.01)
  *H04L 61/5069* (2022.01)
  *H04L 41/12* (2022.01)
  *H04L 69/22* (2022.01)
  *H04L 101/659* (2022.01)

(56) References Cited

U.S. PATENT DOCUMENTS

| | | | |
|---|---|---|---|
| 9,288,066 | B2 | 3/2016 | Hui et al. |
| 9,426,035 | B2 | 8/2016 | Shetty et al. |
| 9,749,410 | B2 | 8/2017 | Thubert et al. |
| 9,900,169 | B2 | 2/2018 | Thubert et al. |
| 9,948,542 | B2 | 4/2018 | Thubert et al. |
| 10,135,756 | B2 | 11/2018 | Pfister et al. |
| 10,200,850 | B2* | 2/2019 | Chao ............... H04L 12/189 |
| 2003/0233540 | A1* | 12/2003 | Banerjee ............ H04L 12/185 713/153 |
| 2015/0230063 | A1* | 8/2015 | Chandramouli ...... H04L 12/189 455/466 |
| 2017/0264532 | A1* | 9/2017 | Guo ................ H04L 65/4076 |
| 2017/0317952 | A1* | 11/2017 | Sillankorva ............ H04L 69/22 |
| 2019/0165964 | A1* | 5/2019 | Bartier ............... H04L 12/185 |
| 2019/0261138 | A1 | 8/2019 | Thubert et al. |

OTHER PUBLICATIONS

Xie et al., "Collision Minimized Firmware Upgrade For LLNS Using Multiple Multicast Domains", Feb. 16, 2018, Disco Systems, IP.com No. IPCOM000252867D, 9 pages.

Hui et al., "Multicast Protocol for Low-Power and Lossy Networks (MPL)", Internet Engineering Task Force (IETF), Request for Comments: 7731, Feb. 2016, [online]. [retrieved on Feb. 19, 2020]. Retrieved from the Internet: URL: <https://tools.ietf.org/pdf/rfc7731.pdf>, pp. 1-29.

Vida, Ed., et al., "Multicast Listener Discovery Version 2 (MLDv2) for IPv6", Network Working Group, Request for Comments: 3810, Jun. 2004, [online], [retrieved on Mar. 19, 2020], Retrieved from the Internet: URL: <https://tools.ietf.org/pdf/rfc3810.pdf>, pp. 1-62.

Deering et al., "IPv6 Scoped Address Architecture", Network Working Group, Request for Comments: 4007, Mar. 2005, [online], [retrieved on Jan. 30, 2020]. Retrieved from the Internet: URL: <https://tools.ietf.org/pdf/rfc4007.pdf>, pp. 1-24.

Narten et al., "Neighbor Discovery for IP version 6 (IPv6)", Network Working Group, Request for Comments: 4861, Sep. 2007, [online], [retrieved on Mar. 19, 2020], Retrieved from the Internet: URL: <https://tools.ietf.org/pdf/rfc4861.pdf>, pp. 1-97.

Schmidt et al., "Multicast Mobility in Mobile IP Version 6 (MIPv6): Problem Statement and Brief Survey", Internet Research Task Force (IRTF), Request for Comments: 5757, Feb. 2010, [online], [retrieved on Mar. 19, 2020]. Retrieved from the Internet: URL: <https://tools.ietf.org/pdf/rfc5757.pdf>, pp. 1-37.

Winter, Ed., et al., "RPL: IPv6 Routing Protocol for Low-Power and Lossy Networks", Internet Engineering Task Force (IETF), Request for Comments: 6550, Mar. 2012, [online], [retrieved on Jan. 31, 2020]. Retrieved from the Internet: URL: <https://tools.ietf.org/pdf/rfc6550.pdf>, pp. 1-157.

Thubert et al., U.S. Appl. No. 16/789,862, filed Feb. 13, 2020.
Thubert et al., U.S. Appl. No. 16/814,227, filed Mar. 10, 2020.

* cited by examiner

DIRECTED MULTICAST BASED ON MULTI-DIMENSIONAL ADDRESSING RELATIVE TO IDENTIFIABLE LLN PROPERTIES

TECHNICAL FIELD

The present disclosure generally relates to directed multicast based on multi-dimensional addressing relative to identifiable low power and lossy network (LLN) properties.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks: such low-power router devices can be referred to as LLN devices, or "RPL nodes" in the case of low-power router devices utilizing the Routing Protocol for Low Power and Lossy Networks (RPL) as described in the Internet Engineering Task Force (IETF) Request for Comments (RFC) 6550. Each LLN device in the LLN typically is constrained by processing power, memory, and energy (e.g., battery power); interconnecting wireless links between the LLN devices typically are constrained by high loss rates, low data rates, and instability with relatively low packet delivery rates. A network topology (e.g., a "RPL instance") can be established based on creating routes in the form of a directed acyclic graph (DAG) toward a single "root" network device, also referred to as a "DAG root" or a "DAG destination". Hence, the DAG also can be referred to as a Destination Oriented DAG (DODAG). Network traffic moves either "up" towards the DODAG root or "down" towards the DODAG leaf nodes.

The constraints in processing power, memory, and energy in the LLN devices described above also result in substantial difficulties in effective deployment of multiple multicast topologies (e.g., multicast trees) across a large physical region having substantially different physical characteristics. Use of only a few multicast trees for almost all multicast traffic in a DAG can result in an unnecessarily large amount of multicast traffic that causes congestion in the LLN and wasted battery power in the LLN devices; creation of a larger number of multicast trees for different multicast traffic in the LLN, however, is not feasible due to the limited memory constraints of the LLN devices that limit the amount of multicast tree topology information that can be stored by the LLN devices.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
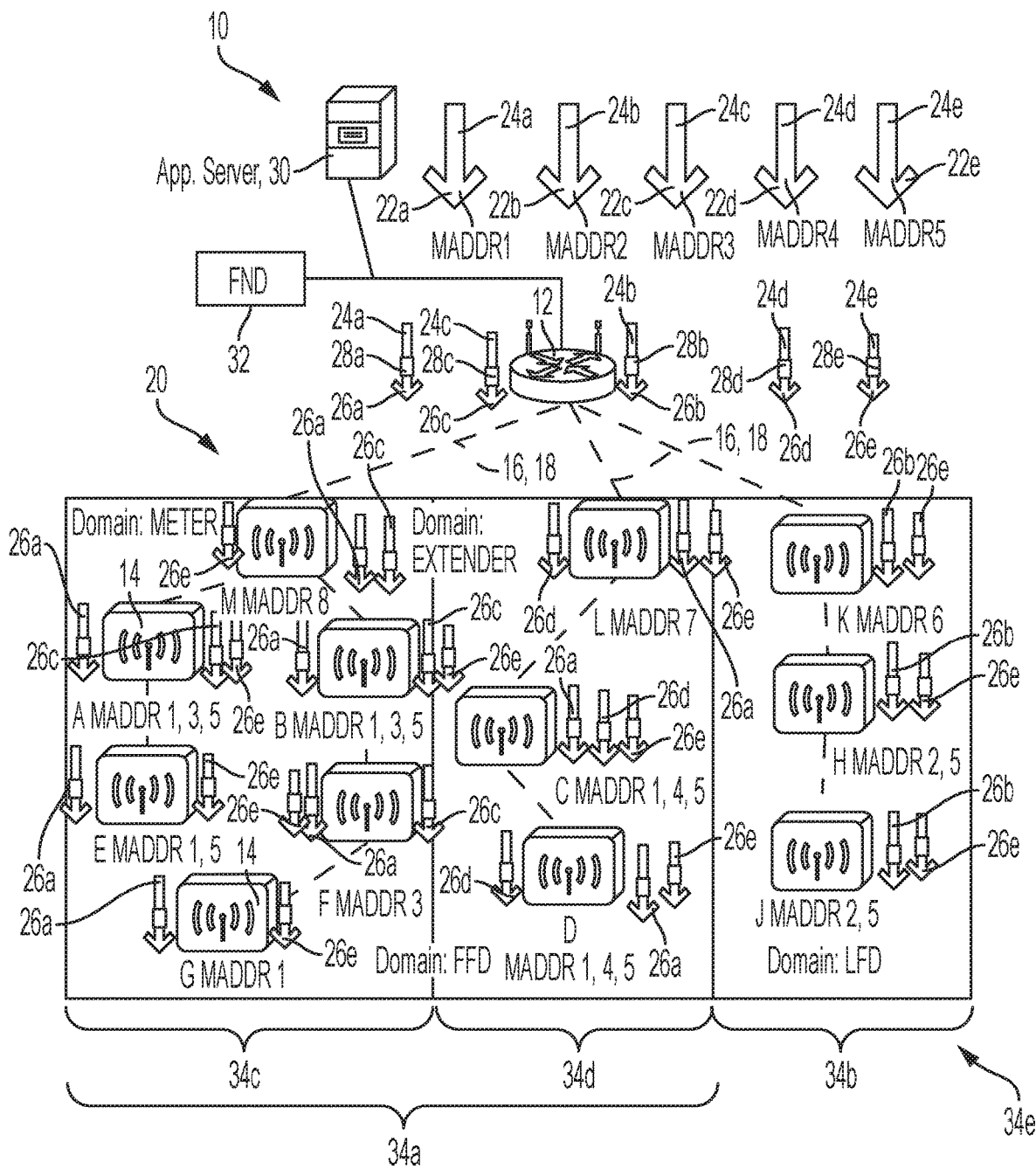
FIG. 1 illustrates an example low power and lossy network (LLN) comprising a root network device rooted at a directed acyclic graph (DAG) topology and configured for generation of a multi-dimensional addressing data structure for directed multicasting of a directed multicast message relative to identified LLN properties, according to an example embodiment.

In one embodiment, a method comprises receiving, by a root network device providing a directed acyclic graph (DAG) topology in a low power and lossy network (LLN), one or more multicast registration messages for an LLN device in the DAG, the one or more multicast registration messages identifying a plurality of distinct properties describing operation of the LLN device in the LLN; receiving, by the root network device, one or more multicast address group identifiers of one or more multicast streams to which the LLN device has subscribed, and associating the one or more multicast address group identifiers with the distinct properties of the LLN device; receiving a multicast message specifying one of the multicast address group identifiers; and generating and outputting, by the root network device, a directed multicast message having a multi-dimensional addressing data structure comprising a selected one of the distinct properties and the one multicast address group identifier, the directed multicast message causing parent network devices in the DAG topology to selectively retransmit the directed multicast message based on determining a child network device has the selected one distinct property.

In another embodiment, an apparatus is implemented as a physical machine. The apparatus comprises non-transitory machine readable media configured for storing executable machine readable code, a device interface circuit, and a processor circuit. The device interface circuit is configured for receiving one or more multicast registration messages from a low power and lossy network (LLN) device in an LLN. The processor circuit is configured for executing the machine readable code, and when executing the machine readable code operable for: identifying from the one or more multicast registration messages, by the apparatus implemented as a root network device configured for providing a directed acyclic graph (DAG) topology in the LLN, a plurality of distinct properties describing operation of the LLN device in the LLN; receiving one or more multicast address group identifiers of one or more multicast streams to which the LLN device has subscribed, and associating the one or more multicast address group identifiers with the distinct properties of the LLN device; receiving a multicast message specifying one of the multicast address group identifiers; and generating and outputting a directed multicast message having a multi-dimensional addressing data structure comprising a selected one of the distinct properties and the one multicast address group identifier, the directed multicast message causing parent network devices in the DAG topology to selectively retransmit the directed multicast message based on determining a child network device has the selected one distinct property.

In another embodiment, one or more non-transitory tangible media are encoded with logic for execution by a machine and when executed by the machine operable for: receiving, by the machine implemented as a root network device providing a directed acyclic graph (DAG) topology in a low power and lossy network (LLN), one or more multicast registration messages for an LLN device in the DAG, the one or more multicast registration messages identifying a plurality of distinct properties describing operation of the LLN device in the LLN; receiving, by the root network device, one or more multicast address group identifiers of one or more multicast streams to which the LLN device has subscribed, and associating the one or more multicast address group identifiers with the distinct properties of the LLN device; receiving a multicast message specifying one of the multicast address group identifiers; and generating and outputting, by the root network device, a directed multicast message having a multi-dimensional addressing data structure comprising a selected one of the distinct properties and the one multicast address group identifier, the directed multicast message causing parent network devices in the DAG topology to selectively retransmit the directed multicast message based on determining a child network device has the selected one distinct property.

DETAILED DESCRIPTION

Particular embodiments optimize directed multicast of a multicast message to selected LLN devices having identifiable LLN properties in an LLN utilizing a DODAG-based topology, for example according to the Internet Engineering Task Force (IETF) Request for Comments (RFC) 6550 and/or RFC 7731, based on generating a directed multicast message having a multi-dimensional addressing data structure. The multi-dimensional addressing data structure can include a multicast address group identifier that can be used for subscribing to an identifiable multicast stream. The multi-dimensional addressing data structure also can include one or more device property identifiers that identify respective distinct properties of an LLN device subscribed to receive the multicast message of the multicast stream. Example device property identifiers can include orthogonal properties such as LLN device location by deployment area and/or device deployment location within the deployment area, device type, device capacity, device operational role, etc.

Hence, a root network device, having registered the device property identifiers of LLN devices having subscribed to one or more multicast streams according to respective multicast address group identifiers, can execute directed multicasting to the subscribed LLN devices via minimized multicast paths based on a multi-dimensional addressing data structure that includes a selected one of the distinct properties of the subscribed LLN devices. The parent network devices in the LLN can selectively forward the directed multicast message, comprising the multi-dimensional addressing data structure, based on determining a child device has the selected one distinct property.

Hence, unrestricted flooding of a multicast message can be prevented based on the parent network devices limiting multicast transmission to child network devices having the selected distinct property in the multi-dimensional addressing data structure.

In one example embodiment, the multi-dimensional addressing data structure can be implemented based on encapsulating the received multicast message with an encapsulating header identifying the selected one distinct property, where the multi-dimensional addressing data structure includes the selected one distinct property in the encapsulating header and the multicast address group identifier in the encapsulated multicast message.

In another example embodiment, the multi-dimensional addressing data structure can be implemented based on generating a multicast IPv6 address comprising the one multicast address group identifier and the corresponding property identifier that identifies the selected property; hence, a root network device can replace an existing IPv6 multicast address from the received multicast message with the multicast IPv6 address comprising the one multicast address group identifier and the corresponding property identifier, enabling a parent network device to extract the property identifier(s), the multicast address group identifier, etc. for selective retransmission based on localized matching of the extracted parameters.

Further, each parent network device can optionally process additional properties in the multi-dimensional addressing data structure, for example the multicast address group identifier, for selective local processing of the directed multicast message or determining whether the directed multicast message should be forwarded to an attached child leaf node (e.g., where the attached child leaf node is a non-RPL device incapable of executing multicasting operations).

Hence, the example embodiments enable directed multicast in a large-scale LLN. The directed multicast can be implemented with minimal multicast storage states in the parent network devices (operated in storing mode, for example according to RFC 6550), as a parent network device needs only to store the registered property identifiers for its child network devices having subscribed to a multicast stream.

The example embodiments enable directed multicast to a level of precision that smart street lamps on a specific street (e.g., "Bourbon Street") within a certain deployment area (e.g., an identified neighborhood or geographic district or block urban area) that are in an "OFF" or "LOW" state can be sent a directed multicast message specifying transitioning to an "ON" state for sixty seconds (e.g., in response to a motion sensor detecting one or more pedestrians), or smart traffic lights on the same street and deployment area can all be instructed to a "RED" light state for thirty seconds (e.g., in response to a smart sensor detecting an emergency value approaching the deployment area via the identified street).

FIG. 1 is a diagram illustrating an example low power and lossy network (LLN) 10 having a root network device 12 and LLN devices (e.g., "A" through "H" and "J" through "M") 14, also referred to as RPL devices or RPL network devices 14, according to an example embodiment. The LLN 10 can be implemented as an Internet Protocol version 6 (IPv6) wireless radio frequency (RF) mesh network, deployed for example using wireless link layer protocols such as IEEE 802.15.4e and/or IEEE 802.15.4g (referred to herein as "IEEE 802.15.4e/g"). In particular, the LLN 10 can be implemented as a smart grid Advanced Metering Infrastructure (AMI) network that can utilize a connected grid mesh (CG-Mesh) that comprises a field area router (FAR) implemented as a root network device 12 and thousands of LLN devices 14, where each LLN device 14 can possibly reach, within its transmission range of its corresponding wireless data link 16, hundreds of neighboring LLN devices 14. The root network device 12 also can be referred to as an LLN border router (LBR). The root network device 12 can be implemented, for example, based on a commercially-available Cisco® Connected Grid Router (CGR) such as the CGR 1000 Series, commercially available from Cisco Systems, San Jose, Calif., modified as described herein. The LLN 10 also can include an application server 30 and a network manager (e.g., a Field Network Director (FND)) 32; optionally the application server 30 can be reachable by the root network device 12 and the network manager 32 via a private and/or public wide area network (WAN) such as the Internet (not shown).

A Low-Power and Lossy Network (LLN) 10 typically operates with strict resource constraints in communication, computation, memory, and energy. Such resource constraints may preclude the use of existing IPv6 multicast routing and forwarding mechanisms. Traditional IP multicast delivery typically relies on topology maintenance mechanisms to discover and maintain routes to all subscribers of a multicast group. However, maintaining such topologies in LLNs is costly and may not be feasible given the available resources.

Memory constraints may limit LLN devices 14 to maintaining links and/or routes to one or a few neighbors, hence RPL according to RFC 6550 specifies both storing and non-storing modes: non-storing mode enables a RPL network device 14 to maintain only one or a few default routes towards an LLN Border Router (LBR) (i.e., root network device) 12 and use source routing to forward messages away from the LBR. The memory constraints also prevent an LLN device 14 from maintaining no more than a few multicast routing topologies.

A network topology (e.g., a "RPL instance" according to RFC 6550) 20 can be established based on creating routes toward a single "root" network device (e.g., a backbone router) 12 in the form of a directed acyclic graph (DAG) toward the DAG root 12, where all routes in the LLN 10 terminate at the DAG root 12 (also referred to as a "DAG destination"). Hence, the DAG also is referred to as a Destination Oriented DAG (DODAG) 20. Network traffic can move either "up" towards the DODAG root 12 or "down" away from the DODAG root 12 and towards the DODAG leaf nodes (e.g., leaf nodes "D", "F", "G", "J", etc.). The root network device 12 can output RPL-based DODAG Information Object (DIO) messages according to RFC 6550 and specifying an identified objective function (OF) and associated topology network metrics (including a DODAG rank of the advertising root network device 12), for formation of a DODAG-based network topology 20 that supports multicast operations.

A "child" network device detecting the DIO can select the DAG root 12 as a parent in the identified DODAG 20 based on comparing network topology metrics (advertised in the DIO) to an identifiable objective function of the RPL instance (e.g., specified in the DIO). The "child" network device, upon attaching to its parent, can output its own DIO with updated network topology metrics (including an updated DODAG rank) that enable other RPL network devices 14 to discover the DODAG 20, learn the updated network topology metrics, and select a DODAG parent.

As described in RFC 6550, each RPL network device 14, in response to the root network device 12 and/or a parent RPL network device 14 in the tree-based DODAG topology 20, can execute an objective function (OF) specified in the DIO message that enables the RPL network device 14 to determine its own "rank" within the DODAG topology 20, where the root network device 12 can be allocated a relatively low-valued rank (e.g., "1"), and a next-hop LLN device (e.g., "L" or "M") can calculate a relatively-higher rank (e.g., "20") based on the corresponding rank of the parent root network device 12 (specified in the received DIO Message) and topology-based metrics associated with execution of the OF. Hence, a LLN device 14, in response to attaching to the root network device 12, can output an updated DIO message specifying the corresponding "rank" of the RPL network device 14 relative to the root network device 12, enabling other network devices to join the tree-based DODAG topology 20 resulting in the tree-based DODAG topology. Hence, a child (e.g., "C") 14 can use the identified objective function and calculate for itself a higher rank (e.g., "50") relative to the corresponding rank (e.g., "20") advertised by its parent (e.g., "L"), and output an updated DIO specifying the corresponding rank (e.g., "50"), enabling the next child device (e.g., "D") 14 to calculate its own corresponding rank (e.g., "100"), etc.

Hence, a LLN device 14 can calculate its own rank within the DODAG 20 based on executing the objective function identified in the received DIO message, and based on the advertised rank and advertised metrics from the received DIO message, detected attributes (e.g., Received Signal Strength Indicator (RSSI)) associated with reception of the DIO message, prescribed constraints or policies set in the LLN device 14 (e.g., minimum/maximum permitted rank values, etc.). Hence the "rank" used by a LLN device 14 can identify a relative positional priority of the LLN device 14 within the LLN device 14, but is distinct from a hop count value: in other words, a "hop count" is not and cannot be used as a "rank" as described herein because a "rank" monotonically increases away from the root network device 12 for formation of the DODAG 20, and the "rank" is determined based on execution of an identified objective function (and therefore can have a nonlinear increase in rank values). Additional details regarding calculating a rank value can be found, for example, in Section 8.2 of RFC 6550.

Downward routes (i.e., away from the DAG root 12) can be created based on Destination Advertisement Object (DAO) messages that are created by a RPL node 14 and propagated toward the DAG root 12. The root network device 12 generating the RPL instance 20 can implement downward routes in the DAG 20 of the LLN 10 in either a storing mode only (fully stateful), or a non-storing mode only (fully source routed by the DAG root). In storing mode, a RPL node 14 unicasts its DAO message to its parent node, such that RPL nodes 14 store downward routing table entries for their "sub-DAG" (the "child" nodes connected to the RPL node). In non-storing mode the RPL nodes 14 do not store downward routing tables, hence a RPL node 14 unicasts its DAO message to the DAG root 12, such that all data packets are sent to the DAG root 12 and routed downward with source routes inserted by the DAG root 12.

Although only the RPL network devices "A" and "G" are labeled with the reference numeral "14" to avoid cluttering in the Figures, it should be apparent that all the RPL network devices "A" through "H" and "J" through "M" are allocated the reference numeral "14" for purposes of the description herein. Further, it should be apparent that all the network devices "A" through "H" and "J" through "M" 14 are configured for establishing wireless data links 16 and DODAG parent-child connections 18 (collectively "wireless DODAG parent-child connections"), even though only the wireless DODAG parent-child connections 18 between the root network device 12 and the RPL network devices "L" and "M" 14 are labeled with the reference numeral "18" (and only the wireless data links 16 of the root network device 12 and the RPL network devices "L" and "M" are labeled) to avoid cluttering in the Figures.

Conventional deployments of the RPL protocol (e.g., according to RFC 6550) can suffer from many inefficiencies in a DAG network topology 20 in LLNs 10 that contain thousands of network devices 14 that are densely deployed in the data network 10. In one example, unrestricted propagation of multicast messages downward in the DODAG 20 of the LLN 10 can enable the root network device 12 to propagate critical management messages to all LLN devices 14, however such unrestricted propagation can create substantial traffic loads in the LLN 10; hence, unrestricted multicasting from the root network device 12 is not scalable in the LLN 10 due to the substantial traffic loads that would be encountered.

Hence, conventional deployments of multicasting in a low power and lossy network (MPL), for example as described in RFC 7731, are not scalable. Consequently, attempts to issue a specific instruction to an identified group of LLN devices 14 in a large-scale LLN comprising thousands of LLN of devices can encounter substantially difficulties in deployment. Attempts to add group-specific identification information to the payload of a multicast message can result in larger multicast message payloads, and can result in a substantially-higher processing burden for each LLN device that must parse a multicast payload to determine whether to process the received multicast packet.

As illustrated in FIG. 1, example embodiments enable a root network device 12 to respond to reception of a multicast message 22 specifying a multicast address group identifier 24 by generating and outputting a directed multicast message 26 that includes one or more selected property identifiers 28. The multicast message (e.g., 22a) output by the application server 30 can comprise a prescribed multicast group identifier (e.g., "MADDR1" 24a) for an identified multicast stream. As described below, the root network device 12 can generate a directed multicast message (e.g., 26a) that contains a multi-dimensional addressing data structure that includes a selected property identifier (e.g., 28a) that identifies a corresponding property for a group of the LLN devices 14, based on multicast address-property identifier mapping that can be provided by the network manager 32.

As described below, each LLN device 14 can register one or more distinct properties with the network manager 32 and/or the root network device 12, and request subscription to one or more multicast streams. Hence, the network manager 32 and/or the root network device 12 can establish an association between multicast streams (identified by respective multicast address group identifiers 24) and one or more LLN properties (identified by respective property identifiers 28). Each LLN device 14 also can unicast transmit to the root network device 12 an advertisement (e.g., a DAO message) specifying one or more properties describing operation of the corresponding LLN device 14 in the LLN 10, and/or one or more multicast registrations identified by the multicast address group identifiers, enabling formation of one or more multicast forwarding trees in the DODAG 20 and arranged according to the "domain" of LLN device properties.

In one embodiment as illustrated in FIG. 1, the property identifier 28a can identify a first "domain" 34a of fully functioning devices (FFD) (e.g., mains powered LLN devices); the property identifier 28b can identify a "domain" 34b of limited functioning devices (LFD) (e.g., battery-operated LLN devices); the property identifier 28c can identify a "domain" 34c of "METER" devices such as Advanced Metering Infrastructure (AMI) meter devices, lighting meter devices, etc.; the property identifier 28d can identify a "domain" 34d of "EXTENDER" devices such as range extender devices for increasing wireless transmission ranges; and the property identifier 28e can identify a "domain" 34e of all forwarding devices (i.e., non-leaf RPL devices in the DODAG 20).

Hence, the root network device 12 can generate a directed multicast message 26 that comprises a multi-dimensional address structure (including the multicast address group identifier 24 and the property identifier 28) that causes selected retransmission of the directed multicast message 26 by the LLN devices 14 based on determining a "subscribed" child LLN device has the device property identified by the corresponding property identifier 28. Hence, selected retransmissions can be executed at the IP layer, eliminating any need for parsing the payload of a received multicast message 22. Further, the directed multicasting can be implemented with minimal storage requirements in the LLN devices 14.

Figure 2:
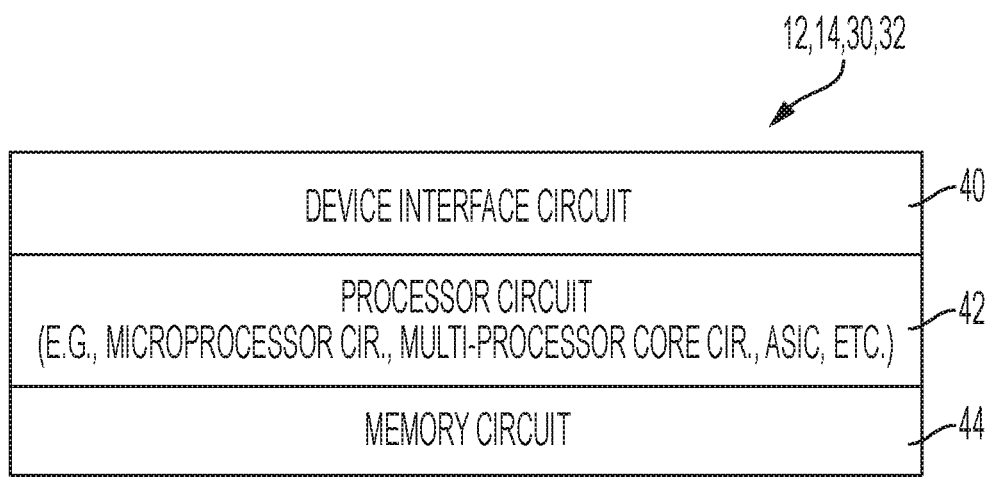
FIG. 2 illustrates an example implementation of any one of the devices of FIG. 1, according to an example embodiment.

FIG. 2 illustrates an example implementation of any of the network devices 12, 14, 30, and/or 32 of FIG. 1, according to an example embodiment. Each apparatus 12, 14, 30, and/or 32 is a physical machine (i.e., a hardware device) configured for implementing network communications with other physical machines via the LLN 10. The term "configured for" or "configured to" as used herein with respect to a specified operation refers to a device and/or machine that is physically constructed and arranged to perform the specified operation.

Each apparatus 12, 14, 30, and/or 32 can include a device interface circuit 40, a processor circuit 42, and a memory circuit 44. The device interface circuit 40 can include one or more distinct physical layer transceivers for communication with any one of the other devices 12, 14, 30, and/or 32; the device interface circuit 40 also can include an IEEE based Ethernet transceiver for communications with the devices of FIG. 1 via any type of data link (e.g., a wired or wireless link, an optical link, etc.). The processor circuit 42 can be configured for executing any of the operations described herein, and the memory circuit 44 can be configured for storing any data or data packets as described herein.

Any of the disclosed circuits of the devices 12, 14 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3:
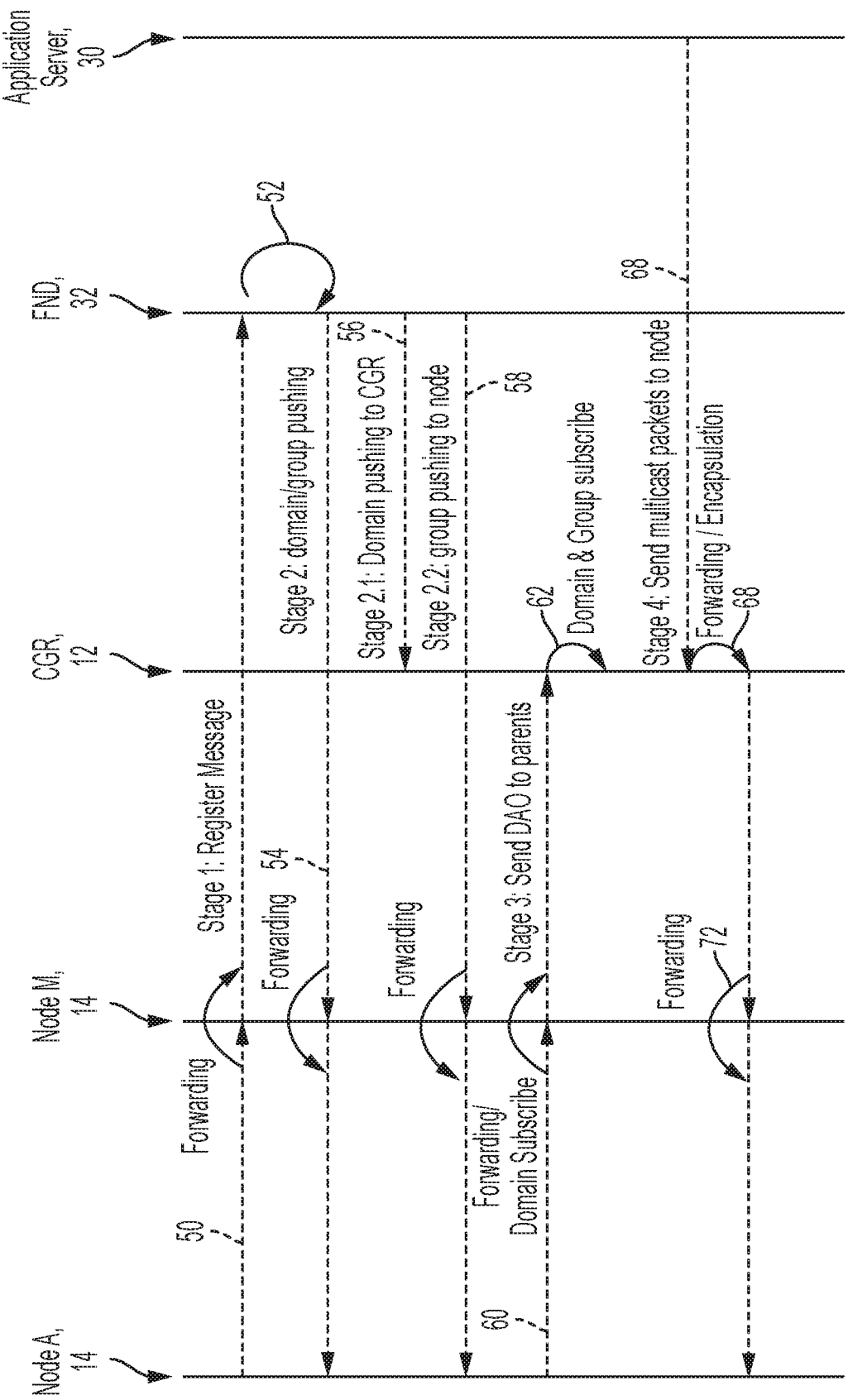
FIG. 3 illustrates a messaging diagram between the devices of FIG. 1, for directed multicasting of a directed multicast message relative to identified LLN properties using a multi-dimensional addressing data structure, according to an example embodiment.

FIG. 3 illustrates a messaging diagram between the devices of FIG. 1, for directed multicasting of a directed multicast message relative to identified LLN properties using a multi-dimensional addressing data structure, according to an example embodiment.

Figure 4A:
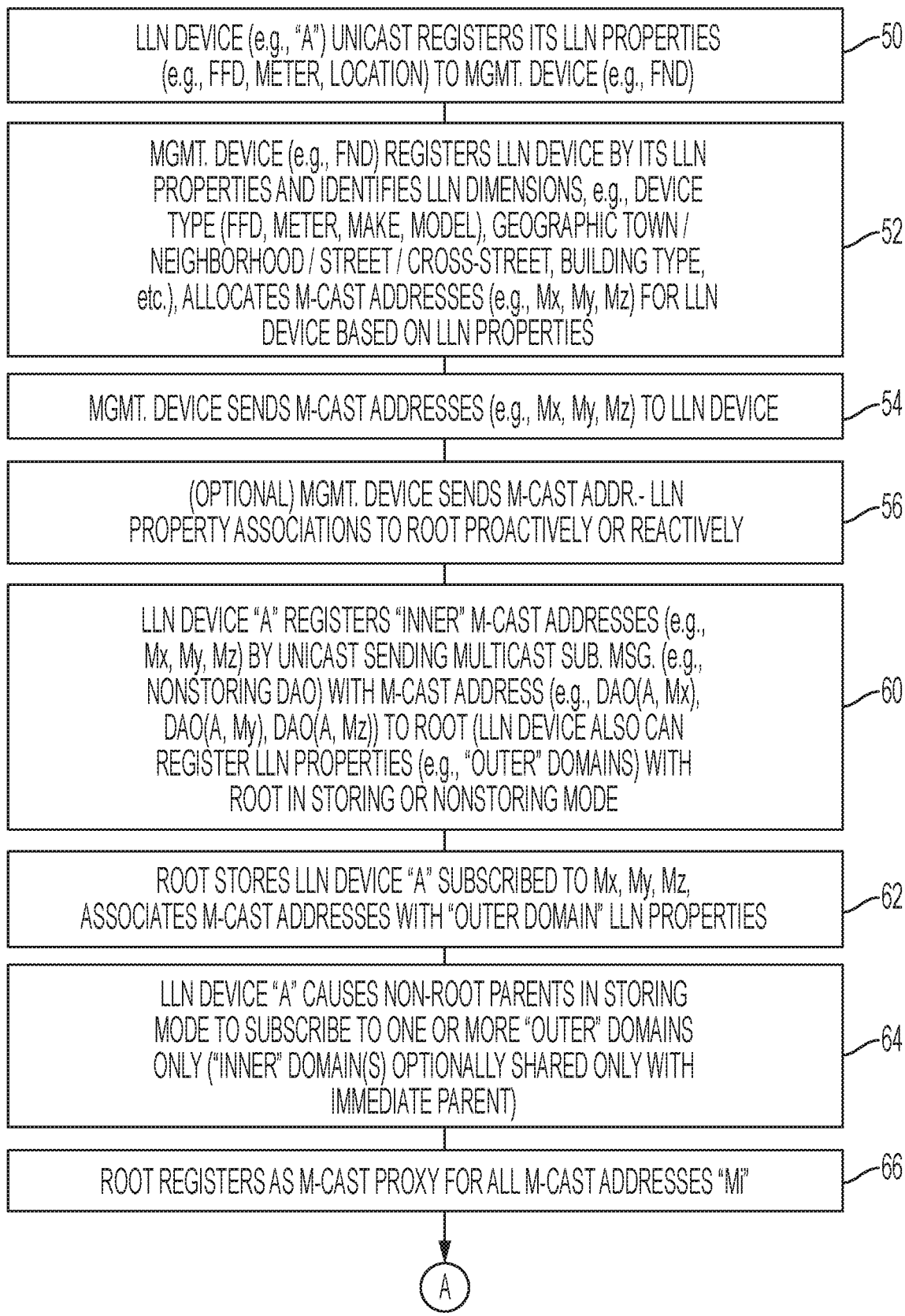
FIGS. 4A-4C illustrate example methods for executing directed multicasting of a directed multicast message relative to identified LLN properties using a multi-dimensional addressing data structure, according to one or more example embodiments.
Figure 4B:
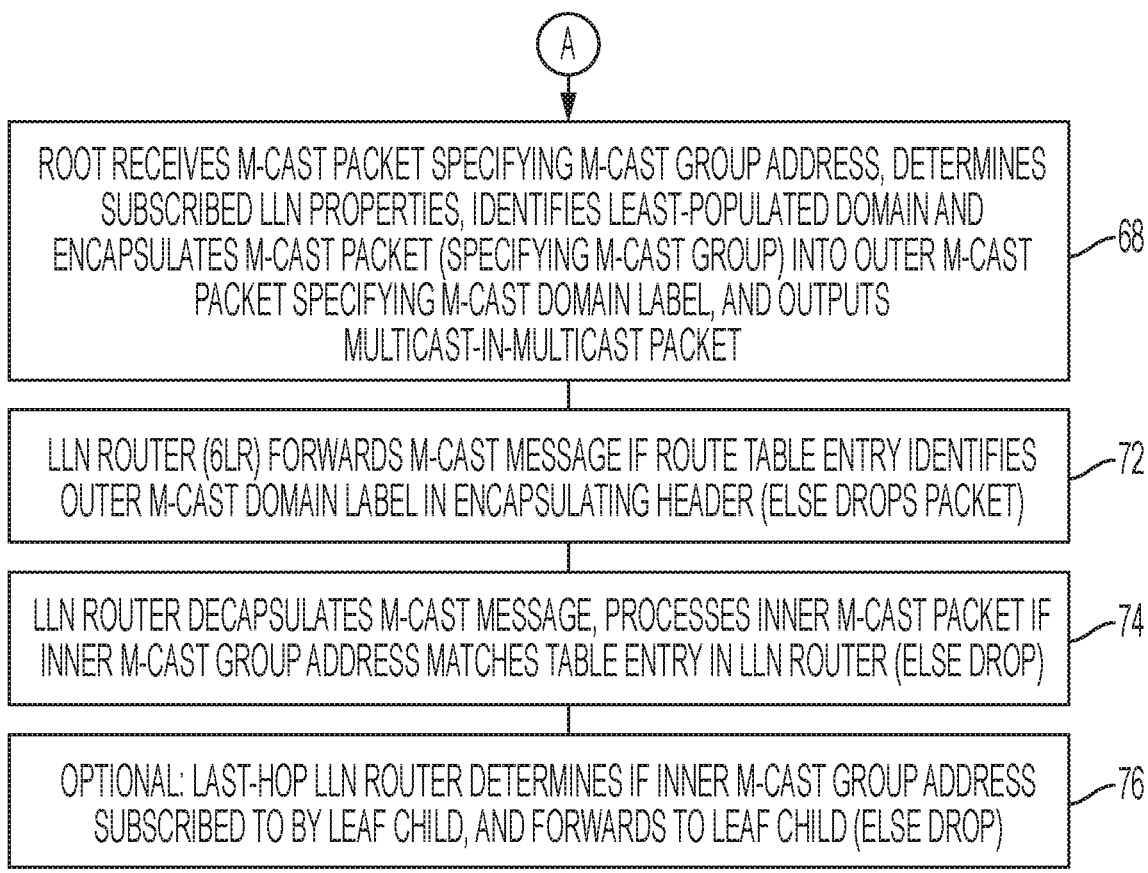
Figure 4C:
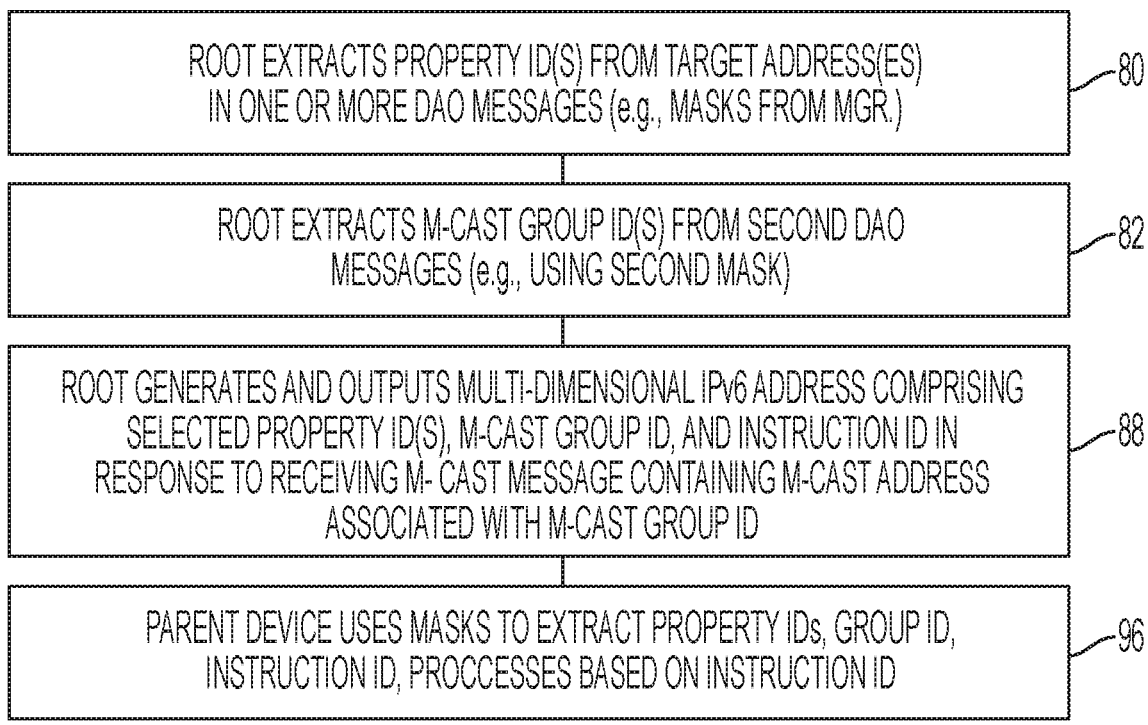

FIGS. 4A-4C illustrate example methods for executing directed multicasting of a directed multicast message relative to identified LLN properties using a multi-dimensional addressing data structure, according to one or more example embodiments.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIGS. 1, 3, and 4A, each LLN device 14 (e.g., LLN device "A") in operation 50 of FIG. 4A is configured for executing unicast registration of each of its identifiable LLN properties describing operation of the LLN device in the LLN 10. For example, the processor circuit 42 of the LLN device "A" 14 in operation 50 can generate and send to the network manager 32 one or more registration messages specifying one or more identified properties such as device capacity "FFD" and device type (e.g., "METER", make and model of the LLN device 14, etc.); the registration message also can specify other distinct properties describing operation of the LLN device, including deployment location (e.g., by neighborhood/district area identifier, street identifier, nearest cross-street identifier, building identifier, building type, floor identifier, and/or room identifier, etc.), device configuration (e.g., firmware revision number), device operational state (e.g., CAMERA ON/OFF, CAMERA IMAGE/VIDEO MODE; LIGHT OFF/LOW/SLOW FLASH/ON; TRAFFIC LIGHT OFF/AUTO/GREEN/YELLOW/RED, etc.). The identified properties can be sent by the LLN device 14 in a single registration message or multiple registration messages, as appropriate.

The processor circuit 42 of the network manager 32 in operation 52 can register an LLN device (e.g., "A") 14 in response to receiving the registration message specifying the one or more identified properties, illustrated in FIG. 4A as device type (FFD, METER), deployment area (by town or neighborhood), deployment location (by street and nearest-cross-street, building type (e.g., apartment dwelling, office building, industrial building, government agency building, etc.). The processor circuit 42 of the network manager 32 can allocate, based on the identified properties in the registration messages, one or more multicast address group identifiers (e.g., Mx="MADDR1", My="MADDR3", Mz="MADDR5") such as IPv6 addresses that can be used by the LLN device (e.g., "A") for subscription to the associated multicast streams.

The processor circuit 42 of the network manager 32 in operation 52 can create a data structure in its memory circuit 44 that identifies the LLN device (e.g., "A"), its registered properties as described above, and the one or more multicast address group identifiers (e.g., Mx, My, Mz) selected by the processor circuit 42 for subscription by the registered LLN device (e.g., "A") to the respective associated multicast streams available in the LLN 10. In another embodiment, the network manager 32 can be "pre-loaded" with all device properties and multicast group identifiers for one or more of the LLN devices 14, enabling an LLN device 14 to "activate" the registration merely by sending in its registration a unique device identifier.

The processor circuit 42 of the network manager 32 in operation 54 can respond to the registration message sent by the LLN device (e.g., "A") 14 by transmitting a registration response that specifies multicast address group identifiers (e.g., Mx, My, Mz) 24 for subscription and the registered properties. In one embodiment, the registered properties can be identified as a "domain" to be used for multicast routing (based on the "domain" specified in an outer encapsulating header), and the multicast address group identifiers can be identified as respective multicast address "groups" for identification within an "inner" encapsulated multicast packet. In another embodiment, the registered properties and multicast address group identifiers can be identified as address components to be identified within a "composite" IPv6 address, where the components can be recovered based on masking operations, described below.

The processor circuit 42 of the network manager 32 in operation 56 can optionally send to the root network device 12 the associations between the multicast address group identifiers 24 and the registered properties, for example in the form of a property identifier 28. Hence, the processor circuit 42 of the root network device 12 in operation 56 can create a data structure, illustrated in Table 1 below, that identifies associations between device properties (e.g., "domains") and relevant multicast address group identifiers.

TABLE 1

DOMAIN ALLOCATION

| Domains | Description | Domain Address |
|---|---|---|
| FFD | All CG-Mesh nodes, except LFD | MADDR1=FF08::C5E1 |
| LFD | Lower function device/lower energy device | MADDR2=FF08::C5E2 |
| METER | All Meters, such as AMI Meter, Lighting Meter, etc. | MADDR3=FF08::C5E3 |
| EXTENDER | All Range Extenders | MADDR4=FF08::C5E4 |
| ALL | All (Non-Leaf) Forwarding Devices | MADDR5=FF08::C5E5 |

As illustrated in FIG. 3, the processor circuit 42 of the network manager 32 in operation 58 can send separate messages identifying the registered outer "domains" and inner multicast "group" identifiers to the LLN device 14, where the outer "domains" can be sent to the LLN device 14 in operation 54 and the inner "groups" can be sent to the LLN device 14 in operation 58.

The processor circuit 42 of the LLN device (e.g., "A") 14 in operation 60 can register its "inner" subscribed multicast addresses (e.g., "Mx=MADDR1" 24a, "My=MADDR3" 24c, and "Mz=MADDR5" 24e) based on unicast transmission to the root network device 12 of one or more unicasted multicast registration messages specifying the subscribed multicast addresses (e.g., "Mx=MADDR1" 24a, "My=MADDR3" 24c, and "Mz=MADDR5" 24e).

In one embodiment of operation 60, the one or more unicasted multicast registration messages specifying the subscribed multicast addresses can be implemented as a unicast DAO message sent by the LLN device 14 to the root network device 12, for example if the root network device 12 has implemented the DODAG 20 in storing mode, ensuring that any parent network devices (e.g., "M" 14) do not enter the subscribed multicast addresses in any routing table; the unicasted multicast registration messages generated and sent by the LLN device (e.g., "A") 14 also can specify the registered LLN properties (e.g., the "outer" properties "FFD" and "METER"), for example based on specifying the respective property identifiers 28a and 28c.

Hence, the processor circuit 42 of the root network device 12 in operation 62 can store in its memory circuit 44 a data structure indicating the LLN device "A" having the device properties including "FFD" 28a and "METER" 28c is subscribed to the multicast streams associated with the multicast address group identifiers "MADDR1" 24a, "MADDR3" 24c, and "MADDR5" 24e, causing the root network device 12 to associate the "inner" multicast address group identifiers 24a, 24c, and 24e with the "outer" property identifiers 28a and 28c.

The processor circuit 42 of the root network device 12 in operation 62 can establish a data structure in its memory circuit 44 of a mapping table of domains and groups, illustrated in Table 2, enabling the association between multicast address group identifiers and properties of the LLN device:

TABLE 2

MAPPING OF "OUTER" DOMAINS AND "INNER" MULTICAST GROUPS

| Nodes | Domains | Groups |
|---|---|---|
| NODE A | FFD, METER | MADDR1, MADDR3, MADDR5 |
| NODE B | FFD, METER | MADDR1, MADDR3, MADDR5 |
| NODE C | FFD, EXTENDER | MADDR1, MADDR4, MADDR5 |
| NODE D | FFD, EXTENDER | MADDR1, MADDR4, MADDR5 |
| NODE E | FFD, METER | MADDR1, MADDR5 |
| NODE F | FFD, METER | MADDR3 |
| NODE G | FFD, METER | MADDR1 |
| NODE H | LFD | MADDR2, MADDR5 |
| NODE I | LFD | MADDR2, MADDR5 |

The processor circuit 42 of the LLN device (e.g., "A") 14 in operation 64 also can send to its immediate parent network device (e.g., "M") a registration message specifying the registered LLN properties (e.g., the "outer" properties "FFD" 28a and "METER" 28c). For example, the LLN device (e.g., "A") 14 in storing mode can send a separate DAO message to its parent network device specifying the registered LLN properties, enabling the parent network device (e.g., "M") to register the LLN properties advertised by the child LLN device "A" 14; the child LLN device (e.g., "A") in nonstoring mode can send a separate neighbor solicitation message (e.g., according to RFC 4861) specifying the child LLN device "A" has the registered LLN properties 28a and 28c. Each parent network device can send to own parent network device a corresponding registration of the LLN properties advertised by a child LLN device 14 (e.g., by a storing DAO message in a storing DODAG 20, or a multicast listener discovery message (MLDv2) according to RFC 3810 in a nonstoring DODAG 20). Also note that a RPL-unaware leaf can subscribe to a multicast address based on sending a MLDv2 message to its immediate parent network device in operation 64.

Hence, the registration messages based on property identifiers 28 establishes a property-based reachability of multicast messages to subscribing child network devices that results in directed multicasting of multicast messages, based on each parent network device executing selective retransmission of a directed multicast message 26 based on the registered property identifiers 28. The registration of property identifiers in the parent network devices effectively results in the multicast tree structure based on device properties, illustrated in FIG. 1 as an FFD domain 34a (comprising the METER domain 34c and the EXTENDER domain 34d), a separate LFD domain 34b, and an ALL FORWARDERS domain 34e.

The processor circuit 42 of the root network device 12 in operation 66 can register itself, for example to the application server 30, as a subscriber to the multicast address group identifiers 24a, 24b, 24c, 24d, and/or 24e, enabling the root network device 12 to receive the associated multicast streams 22a through 22e from a multicast source from a local area network (LAN) connection or a WAN connection.

Referring to FIGS. 3 and 4B, the device interface circuit 40 of the root network device 12 in operation 68 can receive a multicast message 22 from a media source, for example the application server 30 of FIGS. 1 and 3. The multicast message 22 can specify a multicast address group identifier 24, for example any one of the multicast address group identifiers 24a through 24e illustrated in FIG. 1.

The processor circuit 42 of the root network device 12 in operation 68 can respond to reception of the multicast message 22 by identifying the LLN properties of the LLN devices 14 having subscribed to the multicast stream associated with the multicast address group identifier 24 in the received multicast message 22, also referred to as "subscribed LLN properties". For example, in response to receiving the multicast message 22a specifying the multicast address group identifier "MADDR1" 24a, the processor circuit 42 of the root network device 12 can determine the multicast address group identifier "MADDR1" 24a is associated with the FFD domain 34a and the METER domain 34c.

In response to determining the multicast address group identifier "MADDR1" 24a of the received multicast message 22a is associated with the FFD domain 34a and the METER domain 34c, the processor circuit 42 of the root network device 12 in operation 68 can associate the FFD domain 34a with the multicast address group identifier 24a. In one embodiment the processor circuit 42 of the root network device 12 in operation 68 can generate the directed multicast message 26a based on encapsulating the received multicast message 22a with the property identifier 28a corresponding to the associated FFD domain 34a. The processor circuit 42 of the root network device 12 in operation 68 can cause the device interface circuit 40 to output the directed multicast message 26a as a multicast-in-multicast data packet enclosing the multicast message 22a, illustrated in FIG. 5.

Figure 5:
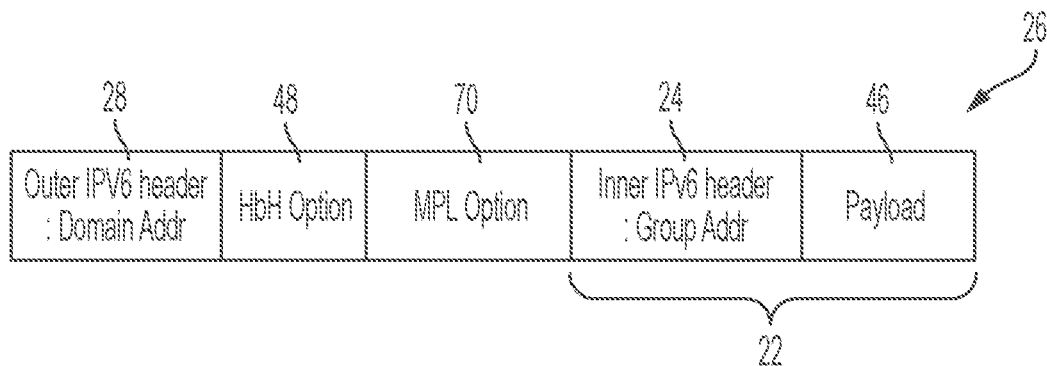
FIG. 5 illustrates an example directed multicast message comprising multi-dimensional addressing data structure that includes an encapsulated multicast address group identifier and an encapsulating header identifying a selected distinct property causing selective retransmissions in the LLN, according to an example embodiment.

As illustrated in FIG. 5, the directed multicast message 26 can comprise the encapsulated multicast message 22 comprising the multicast address group identifier 24 and a payload 46. The directed multicast message 26 also includes an outer IPv6 header specifying the property identifier 28, for example a specific IPv6 address associated with the selected domain 34; the directed multicast message 26 also can include a hop-by-hop (HbH) options extension header 48, and a MPL options header 70 according to Section 6.1 of RFC 7731.

The processor circuit 42 of the root network device 12 in operation 68 also can optionally identify the least-populated domain (having the minimum number of LLN devices associated with a property among the properties associated with the multicast address group identifier 24a) 34c (as illustrated in Table 2 above), and generate a directed multicast message 26 specifying as a multi-dimensional addressing data structure the selected distinct property 28c associated with the least-populated domain 34c, and the multicast address group identifier 24a. Hence, the directed multicast message 26 can be transmitted to a less-populated domain to reduce unnecessary multicast transmissions in the LLN 10 (if desired, inter-domain propagation can be accomplished by last-hop parent network devices finding a match in the outer property identifier 28 and the inner multicast address group identifier 24, and executing limited-hop multicasting of the decapsulated multicast message 22, described below).

The directed multicast message 26a output by the root network device 12 in operation 68 causes each LLN router device 14 (e.g., a 6LoWPAN router (6LR)) in operation 72 to selectively multicast the received directed multicast message 26a if the receiving LLN device (e.g., "M") 14 has a route table entry identifying the outer property identifier 28a: since the receiving LLN device "M" 14 is a member of the FFD domain 34a and the METER domain 34c, the receiving LLN device "M" can retransmit the directed multicast message 26a based on detecting the property identifier 28a (or property identifier 28c) identifying the FFD domain 34a (or METER domain 34c). As illustrated in FIG. 1, the directed multicast message 26a can be propagated within the FFD domain 34a (comprising the METER domain 34c and the EXTENDER domain 34d), while preventing multicasting in the LFD domain 34b, as the LLN device "K" 14 determines the property identifier 28a is not in its forwarding table associated with LLN devices in the LFD domain 34b.

The LLN router (e.g., "M") 14 in operation 74 also can decapsulate the received directed multicast message 26 and determine if there is a match between the inner multicast address group identifier 24 within the decapsulated multicast message 22 and a multicast address to which the LLN router is subscribed. Hence, the processor circuit 42 of the LLN router (e.g., "M") can locally process the received multicast message 22 (e.g., execute an instruction specified in the payload 46) in response to determining a match with the property identifier 28 and the multicast address group identifier 24, else the processor circuit 42 can drop the received multicast message 22.

Hence, each directed multicast message 26 can cause the parent network devices in the DODAG 20 to selectively retransmit the directed multicast message 26 based on determining a child network device has the selected property as identified by the property identifier 28 in the directed multicast message 26. Although the foregoing examples illustrated an "outer" domain 34 based on a device function (e.g., the FFD domain 34a, the LFD domain 34b, the METER domain 34c, the EXTENDER domain 34d, or the ALL FORWARDERS domain 34e), other properties can be used for the "outer" property identifier 28 that encapsulates the "inner" multicast address group identifier 24 in the multicast message 22, for example device deployment area, device location within the deployment area, etc.

Each last-hop LLN router 14 also can provide "proxy" processing of a received multicast message 22 on behalf of a leaf child LLN device that is incapable of executing the above-described selective processing based on the property identifier 28, for example a RPL-unaware leaf. In particular, a last-hop LLN router 14 in operation 76 of FIG. 4B can respond to detecting a match with the property identifier 28 by decapasulating the received directed multicast message 26 and determining if the inner multicast address group identifier 24 matches a local entry specifying one or more multicast addresses to which the child network device has subscribed (e.g., as described previously with respect to operation 64). Hence, the last-hop LLN router 14 can multicast forward a multicast message 22 to a RPL-unaware child network device in response to determining the RPL-unaware child network device has the LLN property identified by the property identifier 28 and has subscribed to the multicast address group identifier 24 specified in the multicast message 22.

Figure 6:
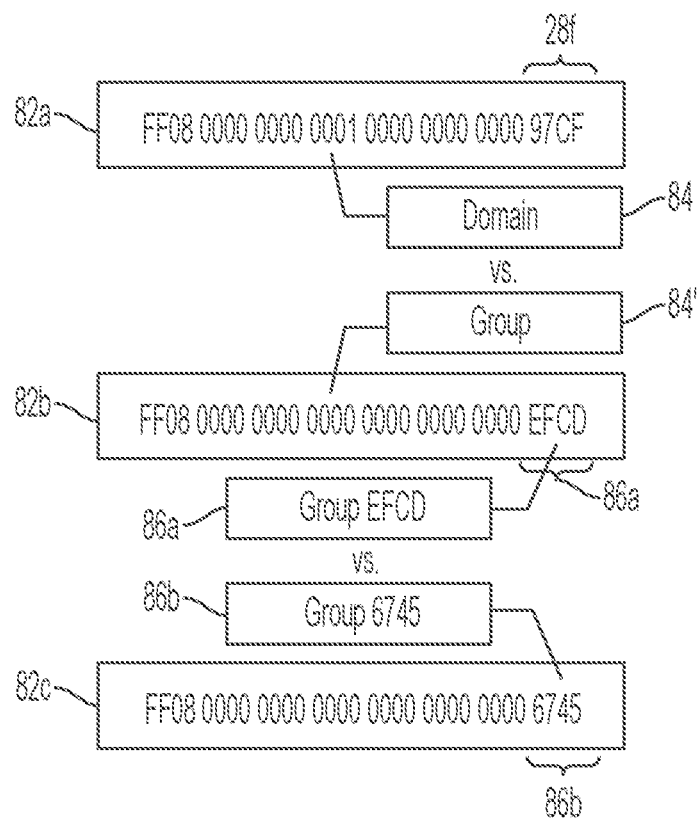
FIG. 6 illustrates example advertisement messages specifying one or more property identifiers or multicast address group identifiers, for generating a multi-dimensional data structure, according to an example embodiment.
Figure 7:
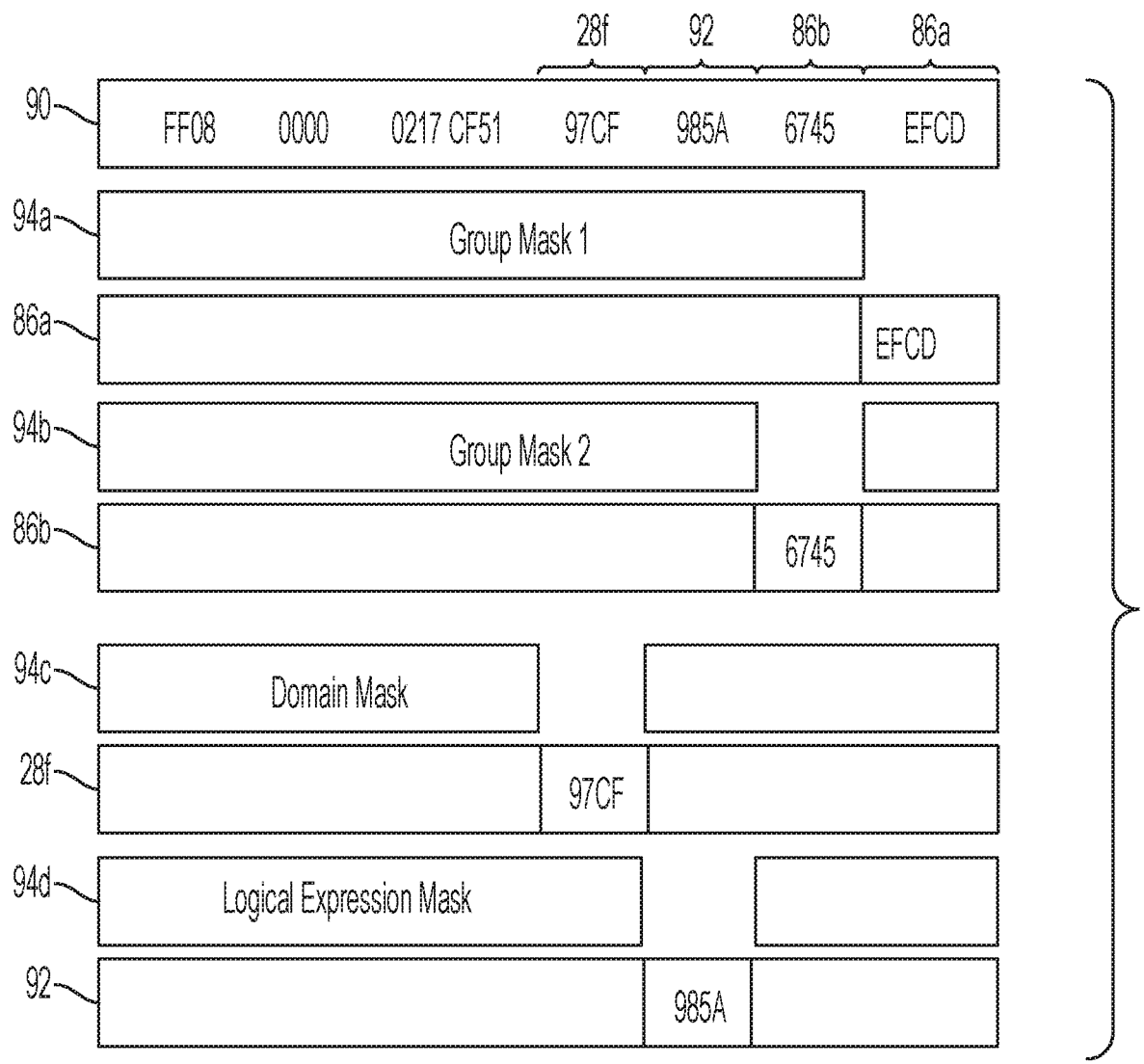
FIG. 7 illustrates an example multidimensional multicast IPv6 address comprising multi-dimensional address identifiers for directed multicasting of a directed multicast message, according to an example embodiment.

FIGS. 4C, 6, and 7 illustrate a variation of the encapsulated directed multicast message 26 illustrated in FIG. 5 according to an alternative embodiment, where the processor circuit 42 of the root network device 12 in operation 80 can extract a plurality of identifiers, including property identifiers 28 and/or multicast address group identifiers 24, from target IPv6 addresses 82a, 82b, and 82c of FIG. 6 specified in one or more DAO messages unicast transmitted by a registering LLN device 14 in operation 60. As illustrated in FIG. 6, the processor circuit 42 of the root network device 12 in operation 80 can extract a property identifier "97CF" (hexadecimal) 28f from the target IPv6 address 82 in response to detecting a "domain" nibble (i.e., 4-bits) 84 set to "1", as opposed to detecting in operation 82 a group identifier "EFCD" 86a from the target IPv6 address 82b (identifying for example, another distinct property of the LLN device or a multicast group identifier for multicast subscription) or a group identifier "6745" 86b from the target IPv6 address 82c in response to detecting the "domain" flag 84' set to zero. The processor circuit 42 of the root network device 12 can store a data structure that associates the property identifier 28f, the group identifier 86a and the group identifier 86b with the LLN device 14 having unicast transmitted DAO messages specifying the respective target IPv6 addresses 82a, 82b, and 82c.

Hence, the processor circuit 42 of the root network device 12 in operation 88 can generate and output a directed multicast message 26 comprising a multidimensional addressing data structure in the form of a composite IPv6 address 90 of FIG. 7. The processor circuit 42 of the root network device 12 in operation 88 can generate the composite IPv6 address 90 based on selecting and inserting one or more property identifiers (e.g., 28f), and one or more group identifiers 86a and/or 86b in response to receiving a multicast message 22 from the application server 30 in operation 68 of FIG. 3. Hence, the processor circuit 42 of the root network device 12 in operation 88 can respond to the multicast address group identifier 24 in the received multicast message 22 by identifying the property identifiers 28 and/or group identifiers 86 associated with the multicast message 22, and generating the composite IPv6 address 90 comprising the property identifier 28f, the group identifiers 86a and 86b, and an instruction identifier "985A" 92 that identifies a prescribed instruction to be executed for processing the composite IPv6 address 90.

The processor circuit 42 of the root network device 12 can replace the multicast address group identifier 24 in the received multicast message 22 with the multi-dimensional composite IPv6 address 90, and output the directed multicast message 26 comprising the composite IPv6 address 90. Hence, each parent network device in the LLN 10 can use selected masks 94a, 94b, 94c, and 94c to extract, from the composite IPv6 address 90 in the received directed multicast message 26, the group identifier 86a, the group identifier 86b, the property identifier 28f, and the instruction identifier 92, respectively. Each parent network device 14 in the LLN 10 can execute the appropriate multicast forwarding instructions based on the instruction identifier 92, for example executing an "ALL AND" operation specifying determining if the parent network device has a match in its forwarding tables for each of the group identifier 86a, the group identifier 86b, and the property identifier 28f, or "DOMAIN AND GROUP" operation specifying if the parent network device has a match for the property identifier 28f and the group identifier 86a or the group identifier 86b.

Hence, the example embodiments of FIGS. 4C, 6 and 7 enable a single composite IPv6 address 90 that can provide multi-dimensional addressing for multiple distinct properties of an LLN device 14. The multi-dimensional addressing in the composite IPv6 address 90 enables directed multicasting of the directed multicast message 26 to specific types of LLN devices (e.g., "Lighting Devices" on "Bourbon Street" near "Toulouse Street" cross-street having an "OFF" or "LOW" state, or "NOT ON" state), for example instructing the specific lighting devices at the precise location to turn to an "ON" state, for example in response to the application server receiving a sensor message indicating a police car is initiating a search at the specified street and cross-street. Hence, the example embodiments enable dynamic, on-demand directed multicasting of directed multicast messages within the LLN 10 in a scalable manner and without overloading constraint requirements of the LLN devices 14.

As described previously with respect to operations 74 and 76 of FIG. 4B, a last-hop LLN router 12 also can determine, from the extracted attributes in the composite IPv6 address 90 of the received directed multicast message 26, whether to execute localized processing on the received directed multicast message 26 based on identifying locally-matching attributes from the extracted attributes relative to the target IPv6 address 82, or whether to execute localized forwarding for a non-RPL child network device based on identifying matching attributes of the non-RPL child network device relative to the extracted attributes and the target IPv6 address 82.

Another optimization can include compression of the properties sent by an LLN device 14 to the root network device 12 via a unicast DAO message. In one embodiment, the following operations can be implemented for compressing domain addresses and/or multicast group addresses. In particular, the group identifiers of domains and group addresses can be assigned sequentially in the network manager 32 and the corresponding LLN device 14. Further, instead of an "FF" prefix at the beginning of an IPv6 multicast address, an alternative "compression control" (CC) byte can be used for identifying domain and group addresses.

The CC byte can include the following format:
Bit 7: Flag set to 1 indicates compression enabled in the domains and groups. Flag set to 0 indicates compression disabled in the domains and groups.
Bit 6: Domain indicates that multicast address is domain address for the given Group ID.
Bit 5: Group indicates that multicast address is group address for the given Group ID.
Bit 4-Bit 3: reserved bits are set to 0.
Bit 2-Bit 0: NumGroupID determines the number of bytes in the following Group ID:
  000: 1 bytes Group ID.
  001: 2 bytes Group ID.
  010: 3 bytes Group ID.
  011: 4 bytes Group ID.
  100: 6 bytes Group ID.
  101: 8 bytes Group ID.
  110: 10 bytes Group ID.
  111: 14 bytes Group ID.

As an example for LLN device A below, there can be two (2) domain addresses "FF03::FC, FF18::C5E1", 4 groups address (FF18::1, FF18::2, FF18::3, FF18::C004). if there is no compression in domains and groups, the total bytes in DAO is 96 bytes (16*6). By adopting above compression mechanism, there are only 7 bytes in domains, 13 bytes in groups. As the group address increases, the compression rate will higher.

TABLE 3

| | | CC BYTE ADDRESS COMPRESSION | | |
|---|---|---|---|---|
| Node | Domain | Domain Compression | Group | Groups Compression |
| A | FF03::FC | 0xC0, 0x03, 0xFC | FF18::1 | 0xA0, 0x18, 0x01 |
| | FF18::C5E1 | 0xC1, 0x03, 0xC5, 0xE1 | FF18::2 | 0xA0, 0x18, 0x02 |
| | | | FF18::3 | 0xA0, 0x18, 0x03 |
| | | | FF18::C004 | 0xA0, 0x18, 0xC0, 0x04 |

According to example embodiments, directed multicasting can be deployed in a scalable manner based on utilizing multi-dimensional addressing, where selected identified properties can be applied to a multicast address. Parent LLN devices of a DAG in the LLN can establish multi-dimensional multicast trees merely by storing locally one or more distinct properties of child LLN devices that are used for directed multicasting. The example embodiments enable dynamic directed multicasting to a select group of LLN devices having precise properties associated with operating in a large-scale LLN, for example specific devices (smart lighting devices) at a specific location (e.g., a two-block area centered at an identifiable street intersection) having a specific state (e.g., "NOT ON").

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
receiving, by a root network device providing a directed acyclic graph (DAG) topology in a low power and lossy network (LLN), one or more multicast registration messages for an LLN device in the DAG topology, the one or more multicast registration messages identifying a plurality of distinct properties describing operation of the LLN device in the LLN;
receiving, by the root network device, one or more multicast address group identifiers of one or more multicast streams to which the LLN device has subscribed, and associating the one or more multicast address group identifiers with the distinct properties of the LLN device;
receiving a multicast message specifying one of the multicast address group identifiers; and
generating and outputting, by the root network device, a directed multicast message having a multi-dimensional addressing data structure comprising a selected one of the distinct properties and the one multicast address group identifier, the directed multicast message causing parent network devices in the DAG topology to selectively retransmit the directed multicast message based on determining a child network device has the selected one distinct property; wherein:
the receiving one or more multicast registration messages includes extracting from each multicast registration message a target IPv6 address specifying a corresponding property identifier for a corresponding distinct property of the LLN device;
the receiving one or more multicast group identifiers includes receiving a plurality of second multicast registration messages specifying respective second target IPv6 addresses, and extracting from each second target IPv6 address a corresponding one of the multicast address group identifiers;
the generating including replacing, from within the multicast message, an existing IPv6 multicast address with the multi-dimensional addressing data structure as a multicast IPv6 address comprising the one multicast address group identifier and the corresponding property identifier identifying the selected one distinct property.

2. The method of claim 1, wherein the generating includes generating the directed multicast message based on encapsulating the multicast message with an encapsulating header identifying the selected one distinct property, the multi-dimensional addressing data structure comprising the encapsulating header and the one multicast address group identifier in the encapsulated multicast message.

3. The method of claim 2, wherein the generating includes selecting the selected one distinct property based on determining a minimum number of LLN devices are associated with the selected one distinct property among the plurality of distinct properties.

4. The method of claim 2, wherein the directed multicast message causes a last-hop parent network device to:
decapsulate the directed multicast message and determine if the child network device has subscribed to the one multicast group identifier, and
selectively forward the directed multicast message to the child network device based on determining the child network device has the selected one distinct property and has subscribed to the one multicast group identifier.

5. The method of claim 1, wherein the multi-dimensional addressing data structure causes minimizing stored multicast routing states in the parent network devices.

6. The method of claim 1, wherein the distinct properties include any one or more of a device type, a device capacity, a deployment area, or a device deployment location within the deployment area.

7. The method of claim 1, wherein the generating further includes inserting, into the multicast IPv6 address, an instruction that causes the parent network devices to extract, from the multicast IPv6 address, the instruction, the one multicast address group identifier, and the property identifier, for selective retransmission based on localized matching based on the instruction.

8. The method of claim 7, wherein the instruction causes each corresponding parent network device to execute localized matching including:
selectively forwarding the directed multicast message to the child network device based on determining the child network device has the selected one distinct property and has subscribed to the one multicast group identifier;
selectively processing locally the directed multicast message based on determining the corresponding parent network device has the selected one distinct property and has subscribed to the one multicast group identifier.

9. An apparatus implemented as a physical machine, the apparatus comprising:

non-transitory machine readable media configured for storing executable machine readable code;

a device interface circuit configured for receiving one or more multicast registration messages for a low power and lossy network (LLN) device in an LLN; and a processor circuit configured for executing the machine readable code, and when executing the machine readable code operable for:

identifying from the one or more multicast registration messages, by the apparatus implemented as a root network device configured for providing a directed acyclic graph (DAG) topology in the LLN, a plurality of distinct properties describing operation of the LLN device in the LLN, receiving one or more multicast address group identifiers of one or more multicast streams to which the LLN device has subscribed, and associating the one or more multicast address group identifiers with the distinct properties of the LLN device, receiving a multicast message specifying one of the multicast address group identifiers, and generating and outputting a directed multicast message having a multi-dimensional addressing data structure comprising a selected one of the distinct properties and the one multicast address group identifier, the directed multicast message causing parent network devices in the DAG topology to selectively retransmit the directed multicast message based on determining a child network device has the selected one distinct property; wherein:

the processor circuit is configured for extracting from each multicast registration message a target IPv6 address specifying a corresponding property identifier for a corresponding distinct property of the LLN device;

the processor circuit is configured for receiving a plurality of second multicast registration messages specifying respective second target IPv6 addresses, and extracting from each second target IPv6 address a corresponding one of the multicast address group identifiers;

the processor circuit is configured for replacing, from within the multicast message, an existing IPv6 multicast address with the multi-dimensional addressing data structure as a multicast IPv6 address comprising the one multicast address group identifier and the corresponding property identifier identifying the selected one distinct property.

10. The apparatus of claim 9, wherein the processor circuit is configured for generating the directed multicast message based on encapsulating the multicast message with an encapsulating header identifying the selected one distinct property, the multi-dimensional addressing data structure comprising the encapsulating header and the one multicast address group identifier in the encapsulated multicast message.

11. The apparatus of claim 10, wherein the processor circuit is configured for selecting the selected one distinct property based on determining a minimum number of LLN devices are associated with the selected one distinct property among the plurality of distinct properties.

12. The apparatus of claim 10, wherein the directed multicast message causes a last-hop parent network device to:

decapsulate the directed multicast message and determine if the child network device has subscribed to the one multicast group identifier, and selectively forward the directed multicast message to the child network device based on determining the child network device has the selected one distinct property and has subscribed to the one multicast group identifier.

13. The apparatus of claim 9, wherein the multi-dimensional addressing data structure causes minimizing stored multicast routing states in the parent network devices.

14. The apparatus of claim 9, wherein the processor circuit is configured for inserting, into the multicast IPv6 address, an instruction that causes the parent network devices to extract, from the multicast IPv6 address, the instruction, the one multicast address group identifier, and the property identifier, for selective retransmission based on localized matching based on the instruction.

15. The apparatus of claim 14, wherein the instruction causes each corresponding parent network device to execute localized matching including:

selectively forwarding the directed multicast message to the child network device based on determining the child network device has the selected one distinct property and has subscribed to the one multicast group identifier;

selectively processing locally the directed multicast message based on determining the corresponding parent network device has the selected one distinct property and has subscribed to the one multicast group identifier.

16. One or more non-transitory tangible media encoded with logic for execution by a machine and when executed by the machine operable for:

receiving, by the machine implemented as a root network device providing a directed acyclic graph (DAG) topology in a low power and lossy network (LLN), one or more multicast registration messages for an LLN device in the DAG topology, the one or more multicast registration messages identifying a plurality of distinct properties describing operation of the LLN device in the LLN;

receiving, by the root network device, one or more multicast address group identifiers of one or more multicast streams to which the LLN device has subscribed, and associating the one or more multicast address group identifiers with the distinct properties of the LLN device;

receiving a multicast message specifying one of the multicast address group identifiers; and generating and outputting, by the root network device, a directed multicast message having a multi-dimensional addressing data structure comprising a selected one of the distinct properties and the one multicast address group identifier, the directed multicast message causing parent network devices in the DAG topology to selectively retransmit the directed multicast message based on determining a child network device has the selected one distinct property; wherein:

the receiving one or more multicast registration messages includes extracting from each multicast registration message a target IPv6 address specifying a corresponding property identifier for a corresponding distinct property of the LLN device;

the receiving one or more multicast group identifiers includes receiving a plurality of second multicast registration messages specifying respective second target IPv6 addresses, and extracting from each second target IPv6 address a corresponding one of the multicast address group identifiers;

the generating including replacing, from within the multicast message, an existing IPv6 multicast address with the multi-dimensional addressing data structure as a multicast IPv6 address comprising the one multicast address group identifier and the corresponding property identifier identifying the selected one distinct property.

17. The one or more non-transitory tangible media of claim 16, wherein the generating includes generating the directed multicast message based on encapsulating the multicast message with an encapsulating header identifying the selected one distinct property, the multi-dimensional addressing data structure comprising the encapsulating header and the one multicast address group identifier in the encapsulated multicast message.

18. The one or more non-transitory tangible media of claim 16, wherein the generating further includes inserting, into the multicast IPv6 address, an instruction that causes the parent network devices to extract, from the multicast IPv6 address, the instruction, the one multicast address group identifier, and the property identifier, for selective retransmission based on localized matching based on the instruction.

19. The one or more non-transitory tangible media of claim 18, wherein the instruction causes each corresponding parent network device to execute localized matching including:
- selectively forwarding the directed multicast message to the child network device based on determining the child network device has the selected one distinct property and has subscribed to the one multicast group identifier;
- selectively processing locally the directed multicast message based on determining the corresponding parent network device has the selected one distinct property and has subscribed to the one multicast group identifier.

\* \* \* \* \*